Patented Feb. 9, 1937

UNITED STATES PATENT OFFICE 2,070,127

PROCESS OF PREPARING COMPOUNDS OF THE THIOUREA SERIES

Josef Hilger, Leverkusen-Wiesdorf, Anton Ossenbeck, Cologne-Mulheim, and Ernst Tietze, Cologne-on-the-Rhine, Germany, assignors to General Aniline Works, Inc., New York, N. Y., a corporation of Delaware No Drawing. Application May 31, 1933, Serial No. 673,790. In Germany June 13, 1932

1 Claim. (Cl. 260—125)

The present invention relates to a process of preparing compounds of the thiourea series, more particularly it relates to compounds which may be represented by the probable general formula:

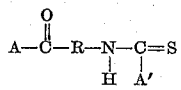

wherein A and A' stand for amino groups or for radicals of watersoluble primary or secondary amines which are attached through the nitrogen atom, and R stands for a radical of the aromatic series.

In accordance with our present invention the compounds of the above identified formula are prepared by starting with a compound of the general formula:

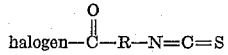

wherein R means the same as stated above, and reacting upon said compounds with ammonia, a primary or secondary watersoluble amine in two stages, in such a manner that the first stage is performed in an aqueous weakly acid medium, while the second stage is performed in an aqueous neutral or weakly alkaline medium.

The first stage is carried out by reacting upon a compound of the above identified formula:

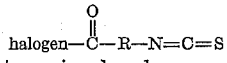

with an about equimolecular proportion of ammonia or a watersoluble primary or secondary amine in an aqueous weakly acid reacting medium, for instance in an aqueous acid having a hydrogen ion concentration pH=about 3 to about 6, at room temperature or slightly raised temperature, say at temperatures between about 15° C. and about 30° C.; favorably the process is carried out at temperatures of about 20° C. in the presence of a suitable aliphatic carboxylic acid, such as formic acid or acetic acid. When working in this manner, the ammonia or watersoluble primary or secondary amine but reacts with the halogen atom of the acyl halogenide group present in the starting compound, while the group N=C=S remains untouched.

In the second stage upon the intermediate product formed and which probably corresponds to the following formula:

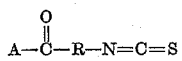

wherein A and R mean the same as stated above, ammonia or a watersoluble primary or secondary amine, favorably in a quantity corresponding to an about equimolecular proportion, is caused to react at room temperature or slightly elevated temperature, say at temperatures between about 15° C. and about 30° C., in an aqueous neutral or weakly alkaline agent, it being mentioned that caustic alkaline reaction is excluded. Generally the step is performed in an aqueous medium having a hydrogen ion concentration pH=7 to about 10. As alkaline agents suitable for performing the process there may be mentioned by way of example, soda, sodium bicarbonate, potassium carbonate and -bicarbonate, magnesium and barium hydroxide. In the second stage the isothiocyano group reacts with the ammonia or the primary or secondary amine with the formation of compounds of the general formula as identified at the top of column 1.

As primary or secondary amines coming into consideration for the purpose of the invention there may be mentioned by way of example methylamine, dimethylamine, sulfanilic acid, aminobenzoic acid, aminonaphthalene sulfonic and carboxylic and sulfocarboxylic acids, aminobenzylaminonaphthalene sulfonic acids, aminoaroylaminobenzene sulfonic and -carboxylic acids and -sulfocarboxylic acids, aminoazobenzenesulfonic acids and the like.

As starting isothiocyano compounds there may be used for example the acid-halogenides of aryl mustard oil carboxylic acids of the formula:

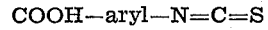

Such starting compounds are obtainable for example by causing thiophosgene to act upon aminocarboxylic acids of the aromatic series in an aqueous medium and transforming the mustard oil carboxylic acids obtained into the corresponding acid halogenides according to methods known per se.

The thiourea compounds prepared in accordance with our new process are intended to find application in the manufacture of dyestuffs.

The invention is illustrated by the following examples, without being limited thereto:

*Example 1.*—To an aqueous acetic acid solution of 319 parts by weight of 1,8-aminonaphthol-3,6-disulfonic acid there are added with well stirring at a temperature of 20° C. 197 parts by weight of m-phenyl mustard oil carboxylic acid chloride. The reaction is complete when a test portion does no more react with sodium nitrite. Then sodium acetate is added until weakly alkaline to litmus, 137 parts by weight of m-aminobenzoic acid are introduced at a temperature of about 20° C., and the condensation is performed with well stirring. When the reaction is complete, the condensation product is isolated by salting out. In its free state it has the probable formula:

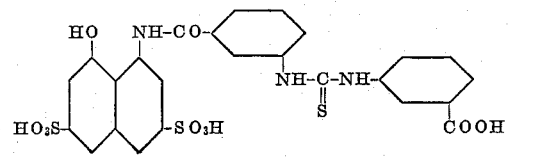

*Example 2.*—When substituting the 1,8-aminonaphthol-3,6-disulfonic acid by an equivalent quantity of 2-aminonaphthalene-5,7-disulfonic acid, and working otherwise according to the directions given in Example 1, there is obtained a condensation product having in the free state the following formula:

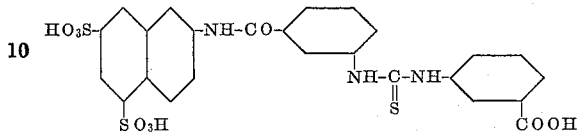

When at first performing the condensation in an acid medium with m-aminobenzoic acid and then with 2-naphthylamine-5,7-disulfonic acid in an alkaline medium, there is obtained the isomeric compound having in its free state the following formula:

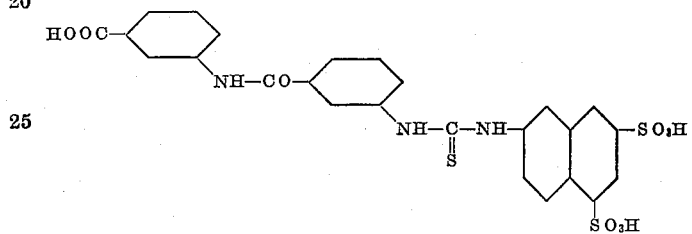

*Example 3.*—50 parts by weight of aniline-3-sulfonic acid are dissolved in 1500 parts by weight of water with the addition of 80 parts by weight of sodium acetate. Into the acetic acid solution thus obtained there is slowly introduced at a temperature of 18° C. with well stirring a solution of 60 parts by weight of phenyl mustard oil m-carboxylic acid chloride in 100 parts by weight of acetone. The stirring is continued for 3 hours at a temperature between about 17 and 19° C. The intermediate product of the formula:

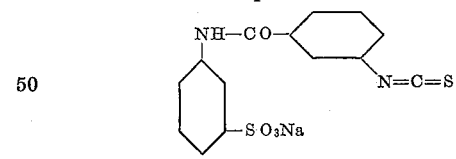

can be separated from the filtered solution by the addition of common salt.

To the clear aqueous solution of the above identified intermediate product there is added the calculated quantity of m-aminobenzoic acid (about 47 parts by weight), and then the solution is rendered alkaline by the addition of sodium bicarbonate. After two hour's stirring at a temperature of 20° C. aminobenzoic acid can no more be detected. The thiourea having in its free state the following formula:

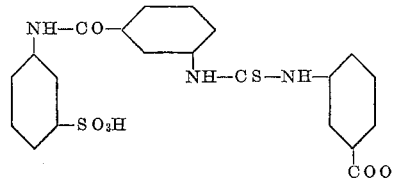

is isolated by acidifying the solution and salting out with sodium chloride. It is obtained in form of a colorless, resinous mass, which afterwards solidifies. Yield about theory.

*Example 4.*—When substituting in Example 1 the 1,8-aminonaphthol-3,6-disulfonic acid by the equivalent quantity of 1-aminobenzene-2,5-disulfonic acid and the 3-aminobenzoic acid by the 4-nitraniline-3-sulfonic acid and working otherwise according to the directions as given in Example 1, there is obtained a condensation product having in the free state the following formula:

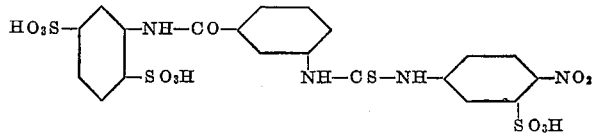

When substituting the m-phenyl mustard oil carboxylic acid chloride by the p-phenyl mustard oil carboxylic acid chloride, there is obtained a condensation product having similar properties.

*Example 5.*—To an aqueous acetic acid solution of 1 molecular proportion of m-aminotoluyl-m-aminobenzoyl-1-naphthylamine-4,6,8-trisulfonic acid there is added with well stirring and at room temperature 1 molecular proportion of finely powdered p-phenyl mustard oil carboxylic acid chloride, and stirring is continued until the free amino group is no more detectable. Then the solution is rendered alkaline by the addition of sodium bicarbonate, one molecular proportion of 3'-aminobenzoyl-2-naphthylamine-5,7-disulfonic acid is introduced, and the condensation is performed with stirring at room temperature, until the free amino group can no more be detected. The condensation product is isolated in form of white crystalline powder by the addition of common salt. In the free state it corresponds to the following formula:

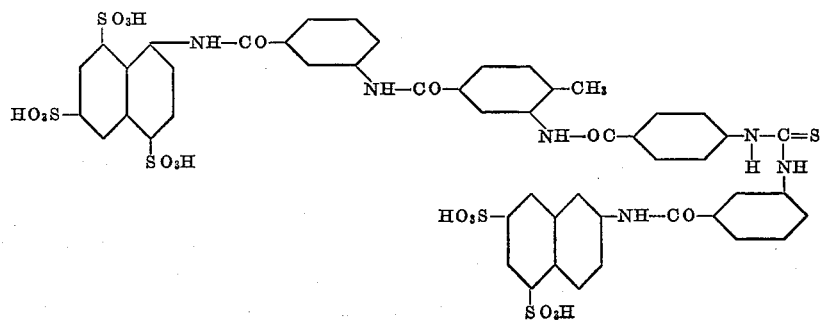

We claim:

The process which comprises reacting upon a compound of the general formula:

halogen—CO—R—N=C=S wherein R stands for a radical of the benzene series, with an about equimolecular proportions of a compound of the group consisting of ammonia and primary and secondary watersoluble amines, in an aqueous acid medium having a hydrogen ion concentration pH=about 3 to about 6, at a temperature between 15° C. and about 30° C., and reacting upon the condensation product formed with an about equimolecular proportion of a compound of the group consisting of ammonia and primary and secondary watersoluble amines in an aqueous neutral or weakly alkaline medium having a hydrogen ion concentration pH=7 to about 10, at a temperature between 15° C. and about 30° C.

JOSEF HILGER.
ATON OSSENBECK.
ERNST TIETZE.